US005558358A

United States Patent [19]

[11] Patent Number: 5,558,358

[45] Date of Patent: Sep. 24, 1996

Johnson

[54] COMBINATION WHEELCHAIR AND WALKER

[76] Inventor: Candace L. Johnson, 10466 Moselle St., San Diego, Calif. 92131

[21] Appl. No.: 492,216

[22] Filed: Jun. 19, 1995

[51] Int. Cl.[6] ........................................ B62M 1/14

[52] U.S. Cl. ........................ 280/648; 280/250.1; 280/650; 280/87.021; 297/5; 297/DIG. 4

[58] Field of Search .............................. 297/5, DIG. 4; 280/250.1, 304.1, 639, 647, 648, 650, 87.01, 87.021, 87.051, 47.4; 135/67

[56] References Cited

U.S. PATENT DOCUMENTS

| | | | |
|---|---|---|---|
| 2,733,754 | 2/1956 | Leslie et al. | 297/6 |
| 3,999,778 | 12/1976 | Markiel | 297/5 X |
| 4,159,110 | 6/1979 | Dodenhoff | 297/5 X |
| 4,307,715 | 12/1981 | Fante | 297/5 X |
| 4,453,729 | 6/1984 | Lucken | 280/250.1 |
| 4,506,900 | 3/1985 | Korosue | 280/250.1 |
| 4,759,562 | 7/1988 | Vinyard et al. | 280/304.1 |
| 5,224,731 | 7/1993 | Johnson | 280/87.021 X |

*Primary Examiner*—Anne Marie Boehler
*Assistant Examiner*—Michael Mar
*Attorney, Agent, or Firm*—Gilliam, Duncan & Harms

[57] ABSTRACT

A combination wheelchair/walker when in a wheelchair configuration having four spaced apart surface support wheels positioned on each corner of a generally rectangular form in which a person is supported thereby. The rear pair of wheels fixed in their direction of travel and the front pair of wheels being pivotable through 360 degrees. In the walker configuration the generally rectangular form is converted into a generally triangular or trapezium support form with the two rear wheels remaining in their original spaced apart position with the front two wheels moved closer together in a relatively reduced spaced apart relationship acting effectively as slightly spaced apart dual wheels. The seat platform of the wheelchair is rigid and folds up against the front of the back of the device in its walker or transport/storage configuration. For storage the rigid seat folds up against the back, the sides of the wheelchair/walker fold inwardly against the back one side over the other in a minimum front to back dimension nesting relationship. A spring biased locking pin secures the sides in the three positions.

2 Claims, 2 Drawing Sheets

COMBINATION WHEELCHAIR AND WALKER

BACKGROUND OF THE INVENTION

This invention is directed to a device that converts from a wheelchair to a walker for the disabled and more particularly for converting a conventional rectangular base form wheelchair into a generally triangular or trapezium base form walker with a steerable front wheel pair spaced closer together than the rear set of wheels and acting somewhat like a single duel wheel.

U.S. Pat. No. 4,759,562 by inventors Lillian L. Vingard et al. issued Jul. 26, 1988 teaches a kit for converting a wheel chair into a walker. The kit includes loose parts that can be inadvertently lost or misplaced when the device is in one or the other configuration. A basic rectangular platform with four corner wheels is used for both the wheel chair and walker configurations.

U.S. Pat. Nos. 4,506,900 and 4,453,729 teach generally conventional rectangular platform wheel chairs with a wheel on each corner of the rectangular.

U.S. Pat. Nos. 4,159,110 and 4,307,715 teach walker devices with a triangular base support with a wheel on each point of the triangle.

My U.S. Pat. No. 5,224,731 overcomes many of the deficiencies of the prior art and has proved to be very viable for the purpose intended. The wheelchair/walker of my prior patent teaches that the longitudinal sides come together for transport or storage. it would be a great advantage if the wheelchair/walker could be made to be even more compact for transport or storage so as to be easily transported in a compact automobile or stored in a small space. It would also be advantagous to eliminate some structure to reduce weight and economic construction costs and yet serve the purpose for which the device is designed.

The instant invention overcomes the deficiencies in the prior art and further advances the teaching of my above mentioned prior patent with regard to convenience of size for use deployment and the ability to be folded into a small profile for transport or storage size.

SUMMARY OF THE INVENTION

The invention is directed to a portable and foldable patient transport device which can be readily converted between a conventional four wheel rectangular support platform person support wheelchair, a conventional three wheel triangular support platform patient walker and be folded into a small package for transport of storage.

The device of the instant invention in the wheelchair configuration has four spaced apart wheels, two in the normal front portion of a wheelchair which pivot relative to the wheelchair direction of travel and two wheels located at the normal rear portion of the wheelchair which are fixed in a forward wheelchair direction. The pivotal front wheel attachment allows the wheelchair to be turned about the fixed in direction rear wheels in a conventional and expected manner.

Rear frame upright members with handles extending from the elevated distal ends in a rearwardly direction for grasping by a person pushing the device when in a wheelchair configuration or by a person using the device as a walker with the fixed in position rear wheels positioned at the lower or opposite ends thereof. An upper and lower frame member are fixedly attached between the two spaced apart handles.

Two side members extend forwardly from the rear frame upright members. One of the side members is pivotably attached directly to one frame upright member in the manner of a bicycle frame to front wheel fork. The other side member is pivotably attached to the rigid extension through a connection similar to the frame to the opposite side member connection. Each front frame member has a pivotable wheel at the lower distal end thereof and extends from the pivotal wheel upward in a first substantially rectilinear direction and then in a substantially curvilinear direction rearwardly and terminating at its pivotal connection.

A rigid seat is pivotably attached to the upper most frame member which allows the seat to be rotated toward the handles and slightly rearwardly of the frame upright members when used as a walker or when prepared for storage. The upper most frame member is bowed outwardly so that when the seat is folded to its upper most non use position it is on a vertical plane substantially parallel with the two uprights and is either between the uprights or slightly external rearwardly therefrom.

A spring biased locking pin is carried by the fixed in position pivotal connection of the two side members to the frame and rigid extension and is translatable toward and away from the side members. The locking pin engages apertures in the rotatable side members located at the three positions of the wheelchair/walker, namely, the wheelchair, walker and storage configurations. The locking pins are manually pulled outward to unlock the side members for free rotation to a selected one of the three positions and then when released they enter the aperture in the rotatable side members and lock that member in the selected position until another position is selected.

When folded for storage, the rigid seat is rotated upward to a position substantially parallel with the rear frame members, the side member pivotally attached directly to the upright member is first rotated against the upward folded seat to a position substantially parallel thereto and the other side member is then rotated to a position substantially parallel to the other side member thereby forming the wheelchair/walker substantially in a rectangular form with a narrow front to back profile.

To prepare for the stroller or wheelchair configuration, the reverse of the locking occurs and the side members are rotated to the selected position and the locking pins are released into their associated apertures to hold the last selected position.

The frame upright members are telescopic the upper portion of which nests into the lower portion this arrangement enables the user to provide height adjustment to the handles and to provide vertical compactness when in the non-use configuration and conventional hand operated brakes are provide on the rear wheels.

An object of this invention is to provide a combined convertible wheelchair and walker which is simple to convert between either use configuration or for storage by a person of limited physical strength.

Another object of this invention is to provide a combined convertible wheelchair and walker which has no removable parts to accomplish the conversion to either of the three configurations.

Another object of this invention is to provide a combined convertible wheelchair and walker which when in a wheelchair configuration has a rectangular wheel supported base and when in the walker configuration has a steerable triangular wheel supported base with the front pair of pivotable wheels positioned together.

These and other objects and advantages of the present invention will become apparent to those skilled in the art after considering the following detailed specification in which the preferred embodiment is described in conjunction with the accompanying drawing Figure.

DETAILED DESCRIPTION OF THE PREFERRED EMBODIMENT

Figure 1:
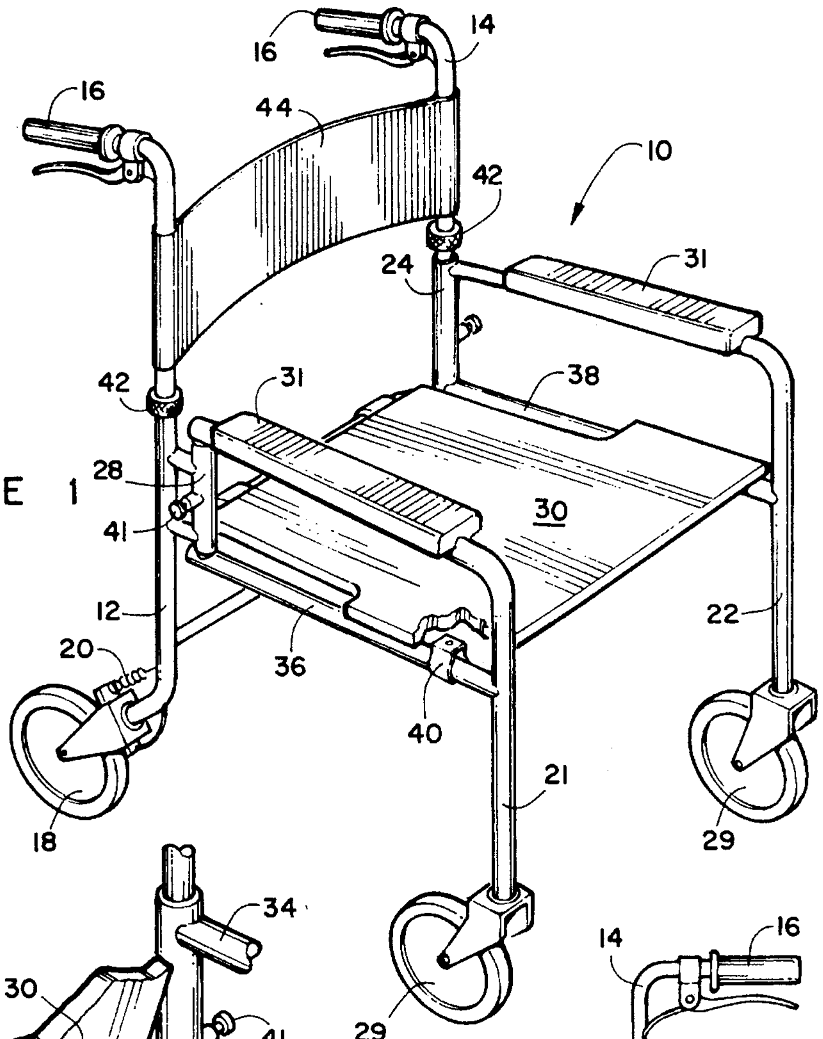
FIG. 1 is a front perspective of the wheelchair/walker of the present invention.
Figure 9:
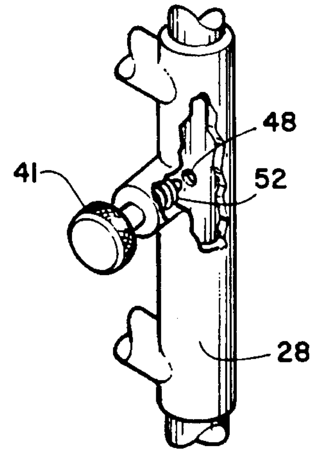
FIG. 9 is a detailed showing of the spring biased locking pin.

Referring now to FIG. 1 which depicts a perspective showing of the wheelchair/walker 10 of the invention in a wheelchair configuration. The wheelchair/walker 10 has a pair of frame upright members 12 and 14 respectively. At the upper ends of the two upright members 12 and 14 are handles 16 which extend in direction away from the rear of the wheelchair/walker for gripping and guiding of the wheelchair/walker by a person either using the wheelchair/walker in either the wheelchair or walker configuration. The opposite ends of the frame upright members 12 and 14 have fixedly directed wheels 18 attached thereto. The rear frame upright members include a braking system 20 conventional in design and explained in detail in my above referenced Patent.

Figure 6:
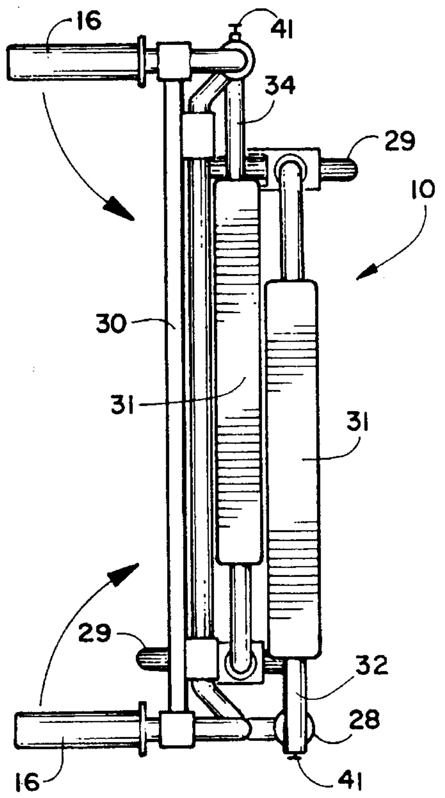
FIG. 6 is a view of the wheelchair/walker in a nonuse ready for storage or transport configuration.
Figure 7:
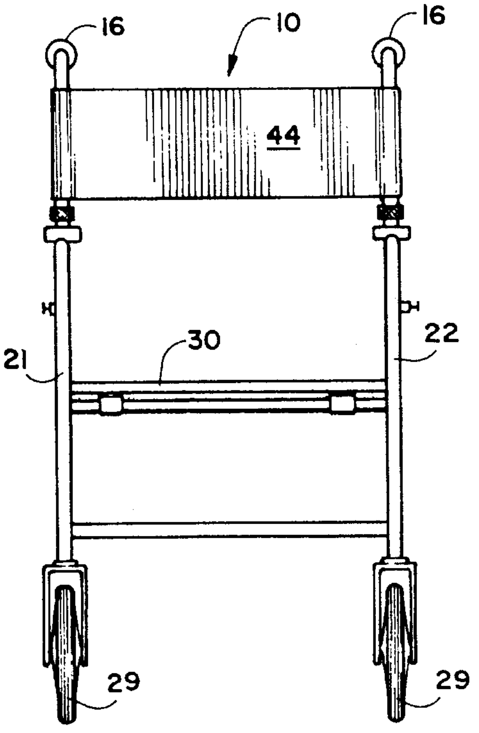
FIG. 7 is a rear view showing of the wheelchair/walker of FIG. 1.

A pair of side members 21 and 22 respectively are pivotably attached to a rear frame upright member either directly as to upright member 14 or indirectly as to upright member 12. The direct attachment as to upright member 14 includes a sleeve 24 which pivots about upright member 14 and rides on cross-member 26 fixedly positioned between the two uprights 12 and 14. Side member 12 is attached to rear frame upright member via an extension member 28. The extension member 28 allows the side member 12 to pivot to the FIG. 6 position over the side member 14 in a nested relationship for storage or transport. The pivot connection of both of the side members resembles that of a bicycle frame to front fork rotatable connection. The pivotal connections can include ball bearing or other friction reducing means well known in the bicycle art. The side members 20 and 22 have a pivotable wheel 29 on the distal ends thereof and extend vertically upward from the wheels and curve at substantially right angles and extend substantially horizontally toward their pivotal connection to the upright members.

Arm rests 31 are fixedly attached to the upper horizontal surface of the side members.

Figure 3:
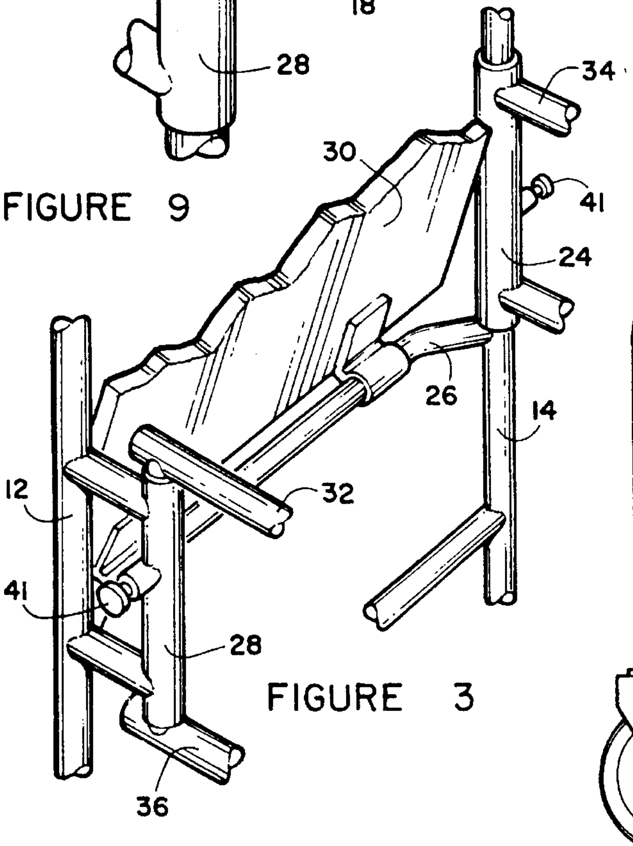
FIG. 3 is a section of the wheelchair/walker depicting the pivotal attachment of the two side members to the uprights and seat pivotal connection.

A rigid seat 30 is pivotably attached to the upper most one of two cross members 32 and 34 respectively fixedly attached between the two upright members and formed to slightly extend to the rear thereof, see FIG. 3.

Figure 2:
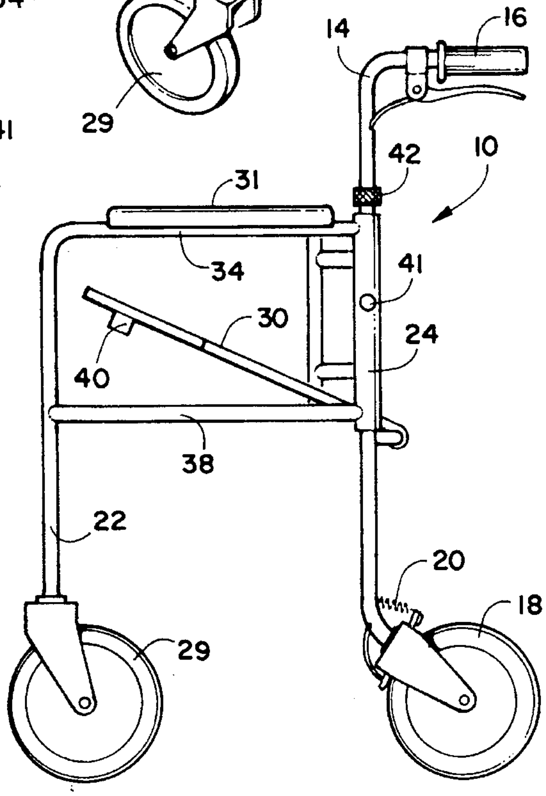
FIG. 2 is a side view of the wheelchair/walker of the invention.
Figure 4:
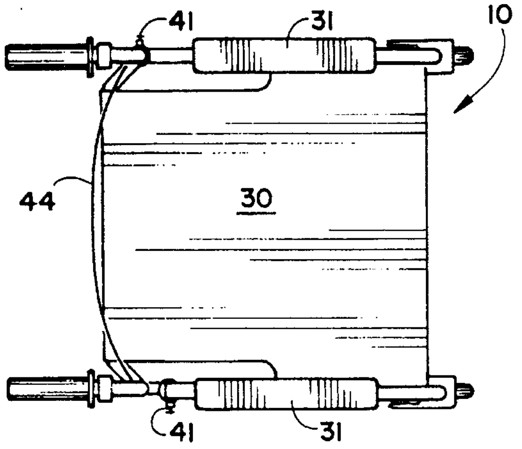
FIG. 4 is a plan view of the wheelchair/walker in the wheelchair configuration.
Figure 5:
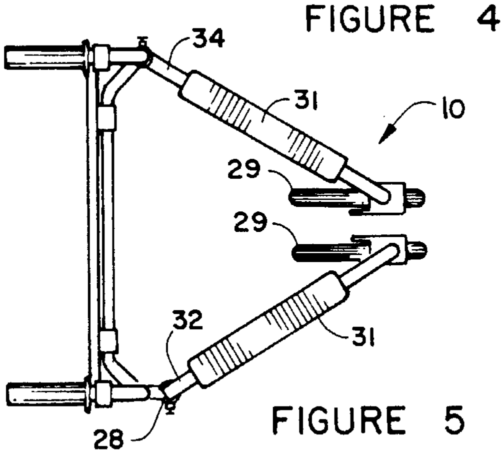
FIG. 5 is a plan view of the wheelchair/walker in the walker configuration.
Figure 8:
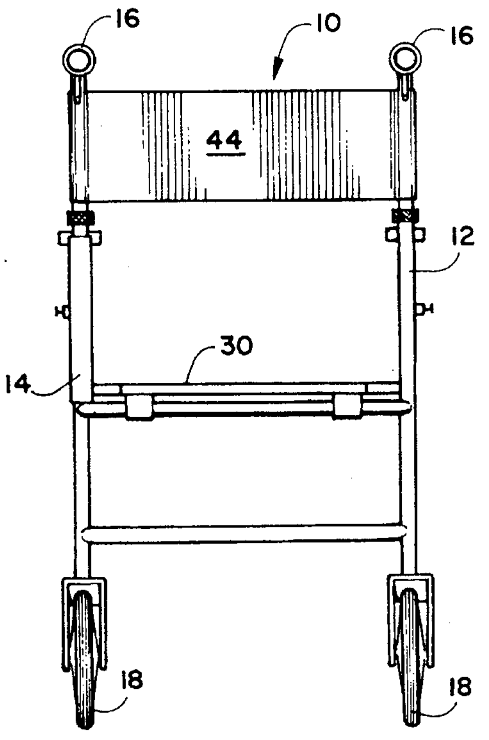
FIG. 8 is a front view showing of the wheelchair/walker of FIG. 1.

When in the FIGS. 1, 4, 8 and 8 position the seat 30 removably snap fits to side member rails 36 and 38. Generally an open spring type clamp 40 fixedly attached to the bottom of the seat 30 is used, however, other convenient means may be employed for selective attachment. FIGS. 2 and 3 show the seat in an intermediate elevated position between a use substantially horizontal position as shown in FIGS. 1, 4, 7 and 8 and a stowed upward position shown in FIGS. 5 and 6. When in the use position the seat because of its rigidness provides support along with a locking pin 41 for maintaining the wheelchair/walker 10 in the wheelchair position as shown in the various Figures.

The rear support members 12 and 14 each telescope vertically to allow for different height users and for storing or transporting the wheelchair/walker in a minimum height configuration. The height is adjustable by loosening the knurled nuts 42, translating the upper half of the rear frame upright which is nested within the lower portion relative to the wheels 18 and tightening the nuts 42 to secure the desired height.

Between the nut 42 and the handles, a soft back 44 is provided for passenger comfort.

As shown in FIG. 3, a locking pin 41 engages aperture 48 in the pivoting portion 24 of the side frame members to lock the side frame members in a selected wheelchair, walker configuration or transport/storage configuration as shown in the various Figures. A spring bias 52 biases the pin toward the aperture thereby holding the pin in the selected aperture. When the side members are locked in the FIG. 6 transportable/storage configuration the wheelchair/walker 10 is rigid and easy to physical handle for transport.

While specific embodiment of the convertible wheel chair/walker has been shown and fully explained above for the purpose of illustration it should be understood that many alterations, modifications and substitutions may be made to the instant invention disclosure without departing from the spirit and scope of the invention as defined by the appended claims.

What is claimed is:

1. A convertible wheelchair/walker device which is convertible between a wheelchair, a walker, and a transport or storage configuration, comprising:

a back frame formed by a pair of uprights interconnected by at least one cross-member, one of said uprights having an extension member extending forwardly therefrom and each of said uprights having a surface support wheel with a fixed direction of rotation mounted at a lower end thereof;

a substantially planar rigid seat pivotably connected to said cross-member;

a pair of side frame members, each having a surface support wheel mounted at a lower forward end thereof for pivotable movement about a vertical axis, one of said side frame members being pivotally connected at a rearward end directly to one of said pair of uprights by means of a first pivotal connection and the other side frame member being connected at a rearward end to said extension member of said one upright by means of a second pivotal connection, the wheelchair/walker device being in a wheelchair mode with a substantially rectangular configuration in plan form when the side frame members are extending forwardly from the uprights and substantially parallel to each other and the seat has been pivoted to a substantially horizontal position between the side frame members, a walker mode with a triangular configuration in plan form when the seat has been pivoted to a substantially vertical position extending between the uprights and the side frame members have been pivoted to bring their forward ends into close proximity, and a transport/storage mode with the side frame members extending parallel to the back frame when the seat has been pivoted to a substantially vertical position extending between the uprights, the one side frame member has been pivoted against an under surface of the seat, and the other side frame member has been pivoted against the one side frame member; and locking means located within said first and second pivotal connections for selectively locking said pair of side frame members in selected pivotal positions relative to the uprights to define the wheelchair, walker, and transport/storage modes.

2. The convertible wheelchair/walker device as defined in claim 1, wherein said locking means for each of said first and second connections comprises a spring biased translatable pin which is insertable into a selective one of apertures which define pivotal positions of the side frame member relative to the upright.

* * * * *